United States Patent
Halcom et al.

(10) Patent No.: US 10,752,347 B2
(45) Date of Patent: Aug. 25, 2020

(54) ROTOR BLADE PITCH HORN ASSEMBLY

(71) Applicant: SIKORSKY AIRCRAFT CORPORATION, Stratford, CT (US)

(72) Inventors: Lance Halcom, Coppell, TX (US); Frank P. D'Anna, Seymour, CT (US); Leonard J. Doolin, Southbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 277 days.

(21) Appl. No.: 15/328,328

(22) PCT Filed: Aug. 18, 2015

(86) PCT No.: PCT/US2015/045669
§ 371 (c)(1),
(2) Date: Jan. 23, 2017

(87) PCT Pub. No.: WO2016/028762
PCT Pub. Date: Feb. 25, 2016

(65) Prior Publication Data
US 2017/0217583 A1     Aug. 3, 2017

Related U.S. Application Data

(60) Provisional application No. 62/039,576, filed on Aug. 20, 2014.

(51) Int. Cl.
*B64C 27/605* (2006.01)
*B64C 27/78* (2006.01)
*B64C 27/82* (2006.01)

(52) U.S. Cl.
CPC ............ *B64C 27/605* (2013.01); *B64C 27/78* (2013.01); *B64C 27/82* (2013.01)

(58) Field of Classification Search
CPC ....... B64C 27/605; B64C 27/78; B64C 27/82; B64C 27/80; B64C 27/54
(Continued)

(56) References Cited

U.S. PATENT DOCUMENTS 2,150,969 A * 3/1939 Hafner ................... B64C 27/54
416/140
3,308,888 A    3/1967 Arcidiacono
(Continued)

OTHER PUBLICATIONS

International Search Report and Written Opinion; International Application No. PCT/US2015/045669; International Filing Date Aug. 18, 2015: dated Nov. 3, 2015; 11 Pages.

*Primary Examiner* — Kenneth Bomberg
*Assistant Examiner* — Michael L Sehn
(74) *Attorney, Agent, or Firm* — Cantor Colburn LLP

(57) ABSTRACT

A rotor assembly includes a rotor hub which rotates about a hub rotation axis and a blade connected to the rotor hub. The blade rotates with the rotor hub around the hub rotation axis, and the blade is configured to rotate around a pitch rotation axis of the blade to adjust a pitch of the blade. The rotor assembly includes a pitch horn having a first end rotatably connected to the blade. The pitch horn is configured to rotate with the blade around the pitch rotation axis of the blade to adjust the pitch of the blade, and the pitch horn is configured to rotate relative to the blade around a pitch horn pivot axis arranged at a non-parallel angle relative to the pitch rotation axis of the blade.

16 Claims, 7 Drawing Sheets

(58) Field of Classification Search
USPC .............................................. 416/147, 168 R
See application file for complete search history.

(56) References Cited

U.S. PATENT DOCUMENTS

| | | | | |
|---|---|---|---|---|
| 3,640,488 | A | * | 2/1972 | Florschutz .............. B64C 27/54 |
| | | | | 244/17.19 |
| 3,957,227 | A | * | 5/1976 | Baskin .................... B64C 27/33 |
| | | | | 244/17.25 |
| 4,047,838 | A | | 9/1977 | Ferris et al. |
| 5,085,315 | A | * | 2/1992 | Sambell .................. B64C 27/30 |
| | | | | 244/17.25 |
| 5,306,119 | A | * | 4/1994 | Bandoh ................... B64C 11/00 |
| | | | | 415/119 |
| 5,415,525 | A | | 5/1995 | Desjardins et al. |
| 5,460,487 | A | * | 10/1995 | Schmaling .............. B64C 27/35 |
| | | | | 267/140.2 |
| 5,478,204 | A | | 12/1995 | Desjardins et al. |
| 5,562,416 | A | | 10/1996 | Schmaling et al. |
| 6,764,280 | B2 | | 7/2004 | Sehgal et al. |
| 7,585,153 | B1 | | 9/2009 | Schmaling et al. |
| 8,257,051 | B2 | | 9/2012 | Stamps et al. |
| 2005/0141995 | A1 | | 6/2005 | Logan et al. |
| 2012/0156033 | A1 | | 6/2012 | Cowles |
| 2013/0064674 | A1 | | 3/2013 | Hunter et al. |

\* cited by examiner

ROTOR BLADE PITCH HORN ASSEMBLY

CROSS REFERENCE TO RELATED APPLICATIONS

This application is a National Stage application of PCT/US2015/045669, filed Aug. 15, 2015, which claims the benefit of U.S. Provisional Application No. 62/039,576, filed Aug. 20, 2014, both of which are incorporated by reference in their entirety herein.

BACKGROUND OF THE INVENTION

Embodiments of the present invention relate to rotor assemblies, and in particular to a rotor blade pitch horn assembly having a pivoting pitch horn.

Rotor systems are well known to provide lift, steering, and propulsion to rotorcraft vehicles. Conventional rotor systems adjust the pitch of rotor blades using a swashplate or other device offset from the rotor head. A swashplate is a pair of plates centered on a rotor shaft. One plate is fixed, such that the rotor rotates relative to the plate, and the other plate rotates with the rotation of the rotor. During operation, the position of the fixed plate is adjusted by translation movement or tilting movement to change the pitch of rotor blades. In particular, the position of the fixed plate is transferred to the rotating plate, which is typically connected to linkages or rods, which are in turn connected to the rotor blades. The position of the fixed plate is transferred through to the linkages and the blades, thereby adjusting the pitch of the rotor blades. However, these conventional pitch control systems create drag, introducing inefficiency to the overall system.

BRIEF DESCRIPTION OF THE INVENTION

Embodiments of the invention relate to a rotor assembly including a rotor hub which rotates about a hub rotation axis and a blade connected to the rotor hub. The blade rotates with the rotor hub around the hub rotation axis, and the blade is configured to rotate around a pitch rotation axis of the blade to adjust a pitch of the blade. The rotor assembly includes a pitch horn having a first end rotatably connected to the blade. The pitch horn is configured to rotate with the blade around the pitch rotation axis of the blade to adjust the pitch of the blade, and the pitch horn is configured to rotate relative to the blade around a pitch horn pivot axis arranged at a non-parallel angle relative to the pitch rotation axis of the blade.

In the above embodiment, or in the alternative, a blade plane may be defined as a plane passing substantially through a leading edge and a trailing edge of the blade, and the pitch horn pivot axis may be substantially orthogonal to the blade plane.

In the above embodiments, or in the alternative, the pitch horn pivot axis may be substantially orthogonal to the pitch rotation axis of the blade.

In the above embodiments, or in the alternative, the blade may include a blade core and a blade shell that covers the blade core, and the pitch horn may be rotatably connected to the blade core.

In the above embodiments, or in the alternative, a junction of the pitch horn and the blade may include a hinge element, such that the pitch horn is configured to rotate around a center axis of the hinge element.

In the above embodiments, or in the alternative, the hinge element may include one or more fixing pins that extend through the hinge element to connect the blade to the pitch horn.

In the above embodiments, or in the alternative, the pitch horn may be located substantially above a lower plane defined by a lower outer surface of the blade and substantially below an upper plane defined by an upper outer surface of the blade.

In the above embodiments, or in the alternative, the rotor assembly may include a control beam connected to a second end of the pitch horn opposite the first end, such that actuation of the control beam moves the second end of the pitch horn, causing the first end of the pitch horn to rotate around the pitch rotation axis of the blade and around the pitch horn pivot axis.

In the above embodiments, or in the alternative, the second end of the pitch horn may include a spherical joint connected to the control beam.

In the above embodiments, or in the alternative, the control beam may include a first end connected to the pitch horn and a second end opposite the first end, and the second end of the control beam may be located inside the rotor hub. In the alternative, the second end of the control beam may be located outside the rotor hub.

In the above embodiments, or in the alternative, the control beam may include a first end connected to the pitch horn and a second end opposite the first end, and actuation of the control beam may include rotation of the control beam around a control beam rotation axis between the first end and the second end.

In the above embodiments, or in the alternative, the control beam may include a first end connected to the pitch horn and a second end opposite the first end, and actuation of the control beam may include rotation of the control beam around a control beam rotation axis at the second end of the control beam.

Another embodiment of the invention relates to a pitch horn including a first end, a second end, and a beam connecting the first end to the second end. The first end may have a first joint element defining a pitch horn pivot axis, such that the first end pivots relative to a blade connected to the first end. The second end may include a spherical joint for connecting to a pivot control element that applies a force to the spherical joint to cause the pitch horn to pivot around the pitch horn pivot axis and around a pitch rotation axis of the blade connected to the joint element to change a pitch of the blade.

In the above embodiment, or in the alternative, the pitch horn may include two prongs at the first end separated by a space for receiving a blade core, the two prongs including joint elements for rotatably connecting to the blade core to rotate the pitch horn relative to the blade core. In the alternative, the pitch horn may include a single prong for fitting between two prongs of a blade core. The single prong may include a joint element for rotatably connecting to the two prongs of the blade core to define the pitch horn pivot axis.

According to yet another embodiment of the invention, a rotorcraft includes a rotorcraft body and a rotor assembly. The rotor assembly includes a rotor hub which rotates about a hub rotation axis and a blade connected to the rotor hub. The blade rotates with the rotor hub around the hub rotation axis, and the blade is configured to rotate around a pitch rotation axis of the blade to adjust a pitch of the blade. The rotor assembly includes a pitch horn having a first end rotatably connected to the blade. The pitch horn is configured to rotate with the blade around the pitch rotation axis of the blade to adjust the pitch of the blade, and the pitch horn is configured to rotate relative to the blade around a pitch horn pivot axis arranged at a non-parallel angle relative to the pitch rotation axis of the blade.

In the above embodiment, or in the alternative, the rotor assembly may include a first rotor assembly for controlling an altitude of the rotorcraft and a second rotor assembly substantially orthogonal to the first rotor assembly for controlling one or both of a directional facing and a speed of the rotorcraft. In addition, the pitch horn may include a first pitch horn of the first rotor assembly and a second pitch horn of the second rotor assembly.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Conventional rotor assemblies utilizing exposed swashplates, pitch beams, pitch control rods, and control beams generate drag on a rotor. Embodiments of the invention relate to a rotor assembly having a pitch horn that reduces drag of the rotor assembly.

Figure 1:
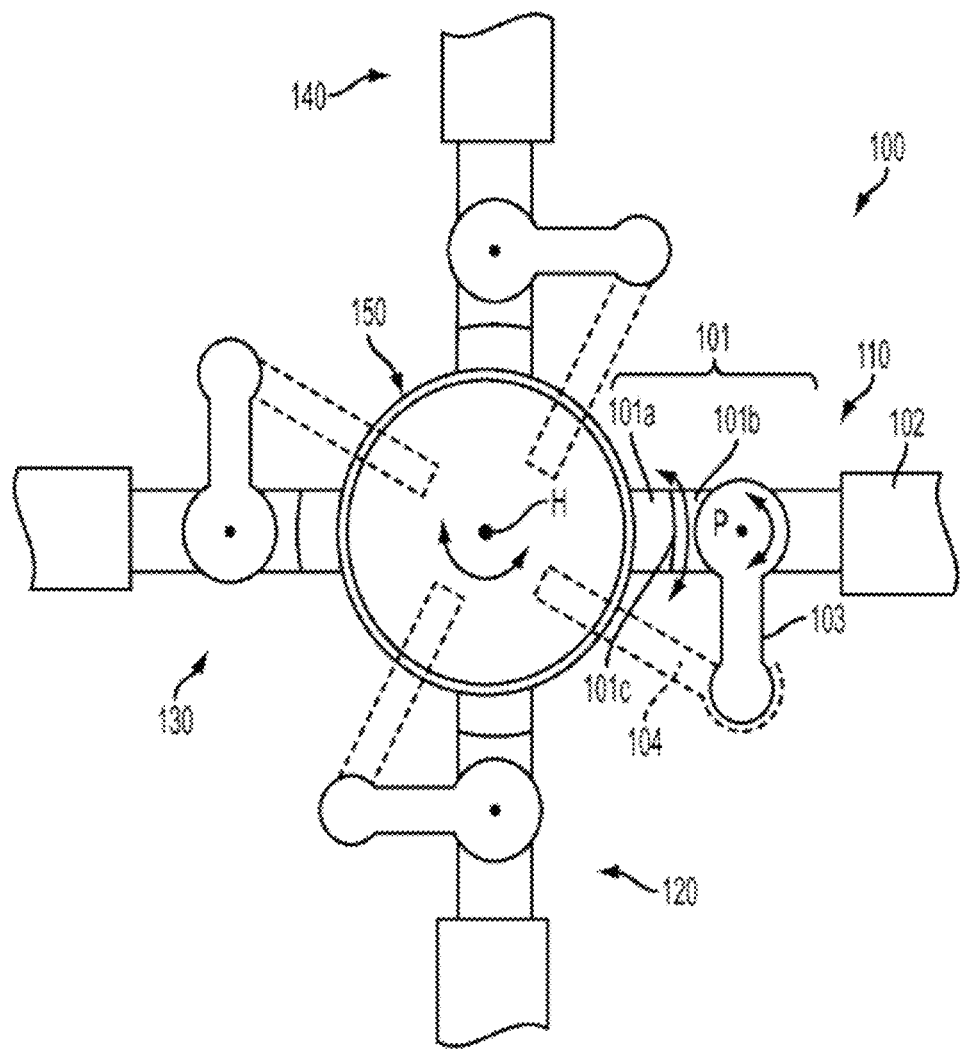
FIG. 1 illustrates a rotor assembly according to an embodiment of the invention.

FIG. 1 illustrates a rotor assembly 100 according to an embodiment of the invention. The rotor assembly 100 includes rotor blades 110, 120, 130 and 140 surrounding a rotor hub 150 that rotates about a hub rotation axis H. The rotor blade 110 includes a blade core 101 including a fixed end 101a that is fixed with respect to the hub 150, and a rotating end 101b that rotates with respect to the fixed end 101a to adjust a pitch of the rotating end 101b and blade shell 102. In embodiments of the invention, the blade core 101 forms the structural support of the blade 110, while the shell 102 (also referred to as a cover or sleeve) may be a skin over the surface of the blade core 101 which forms an aerodynamic surface of the blade 110. The two ends 101a and 101b are joined by a rotating joint 101c, such as by bearings or any other rotatable mechanisms.

The blade core 101 may be made of any suitable material based on design considerations of the rotor assembly 100 and a rotorcraft associated with the rotor assembly 100. In one embodiment, the blade core 101 is made of a flexbeam or spar which reacts to a flight load of the blade 110. The rotating end 101b is illustrated in FIG. 1 as a single beam for purposes of illustration, but embodiments encompass any number of joined segments.

A first end of a pitch horn 103 is connected to the blade core 101, and an opposite end of the pitch horn 103 is connected to a pivot control mechanism 104, such as a control beam. In one embodiment, the pivot control mechanism 104 is a control beam having one end connected to the pitch horn 103 by a spherical joint and an opposite end of the control beam is located inside the hub 150. In such an embodiment, a pitch control mechanism inside the hub 150 may interact with the end of the control beam inside the hub 150 to cause the control beam to apply a force to the pivot horn 103, which in turn causes the blade 110 to change in pitch. The first end of the pitch horn 103 is rotatably attached to the blade core 101 to permit the pitch horn 103 to pivot around the pivot axis P.

In one embodiment, the control beam is a walking beam that rotates around a control beam rotation axis between the ends of the control beam. In another embodiment, the control beam is a walking beam that rotates around a control beam rotation axis at an end of the control beam opposite the pitch horn. In yet another embodiment, the control beam is a pitch beam that moves in a translational manner, and does not pivot around any axis. Embodiments of the invention are not limited to the described control beams, but may include control beams that actuate the pitch horn 103 in any manner, as well as any other pivot control mechanisms 104 that actuate the pitch horn 103.

While FIG. 1 illustrates a rotor assembly 100 having four blades 110, 120, 130, and 140, embodiments of the invention are not limited to such an assembly. Rather embodiments of the invention include rotor assemblies having any number of blades. In addition, while FIG. 1 illustrates a control beam having one end inside the hub 150, in some embodiments, both ends of the control beam are external to the hub 150.

Figure 2A:
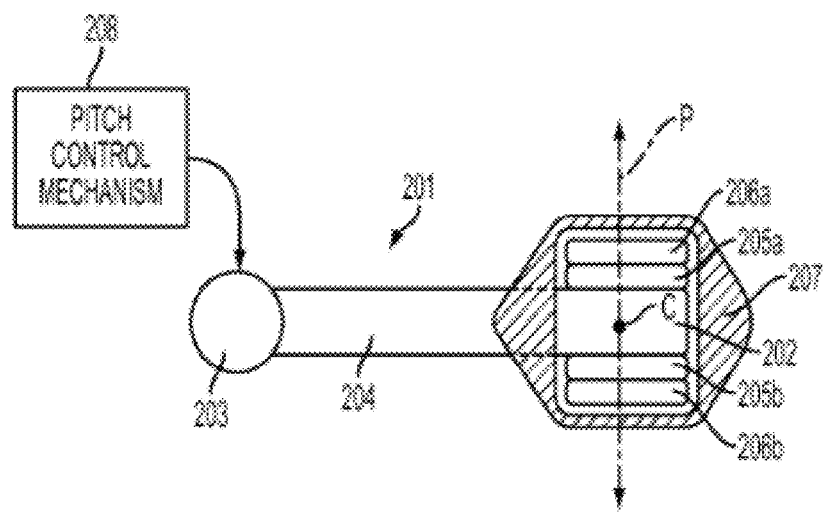
FIG. 2A is a side/cross-section view of a portion of a rotor assembly according to an embodiment of the invention.
Figure 2B:
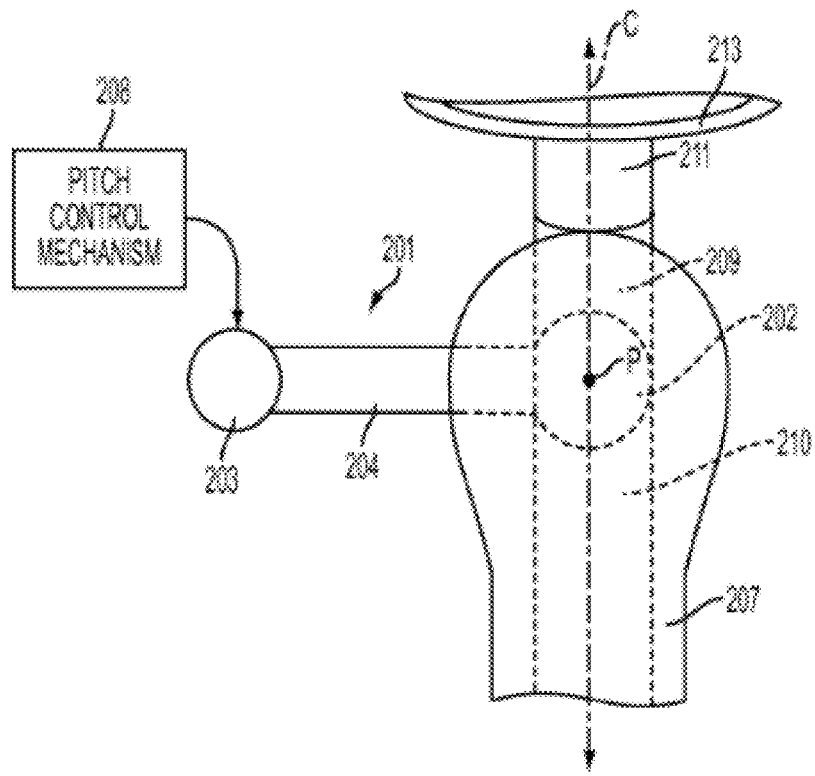
FIG. 2B is a top view of a portion of the rotor assembly according to an embodiment of the invention.

FIGS. 2A and 2B illustrate side/cross-section and top views, respectively, of a portion of a rotor assembly according to embodiments of the invention. As illustrated in FIGS. 2A and 2B, a pitch horn 201 includes a first end 202, a second end 203, and a beam 204 connecting the first end 202 to the second end 203. The blade core includes a first portion 209 on a first side of the pitch horn 201, a second portion 210 on a second side of the pitch horn 201, and a third portion 211 connected to a hub 213. The first and second portions 209 and 210 of the blade core are configured to rotate with respect to the third portion 211 to adjust the pitch of the blade shell 207. The first portion 209 includes prongs 205a and 205b on opposite sides of the pitch horn 201, and the second portion 210 includes prongs 206a and 206b on opposite sides of the pitch horn 201.

While the first and second portions 209 and 210 are illustrated as separate segments having separate prongs 205a, 205b, 206a, and 206b, in some embodiments the first and second portions 209 and 210 are part of a unitary, contiguous blade core structure, the prongs 205a and 206a are a unitary, contiguous and integral prong, and the prongs 205b and 206b are a unitary, contiguous, and integral prong. In such an embodiment, a hole may be formed in the unitary blade core made up of portions 209 and 210 to form an opening for receiving the first end 202 of the pitch horn 201.

The blade core 209, 210, 211 is covered along at least a portion of its length by a blade shell 207, which is also referred to as a cover or sleeve. In operation, a pitch control mechanism 208, such as a control beam or pitch beam applies a force to the second end 203 of the pitch horn 201, causing the pitch-rotatable portions of the blade core 209, 210 to rotate around the blade core pivot axis C. As a result, the pitch of the blade core portions 209 and 210 and the shell 207 are changed. In other words, the pitch horn 201 rotates together with the blade core portions 209 and 210. In addition, the rotatable connection of the first end 202 of the pitch horn 201 with the blade core portions 209 and 210 allows the pitch horn 201 to rotate around the pivot axis P relative to the blade core portions 209 and 210.

While FIGS. 2A and 2B are provided to illustrate one structure of the pitch horn 201, and the rotation of the pitch horn 201 relative to the blade core 209 and 210 and the hub 213 for purposes of illustration and not by way of limiting the invention to the described embodiments, it is understood that embodiments of the invention encompass rotor assemblies having additional structures, such as structures or mechanisms to permit the blade shell 207 to adjust a lead or lag position of the rotor blades or to adjust any other positional characteristics of the rotor blades.

Figure 3A:
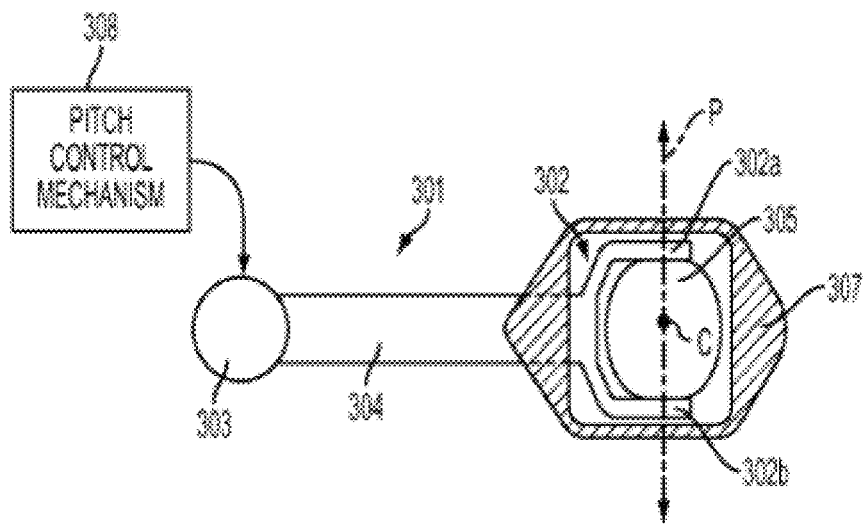
FIG. 3A is a side/cross-section view of a portion of a rotor assembly according to an embodiment of the invention.
Figure 3B:
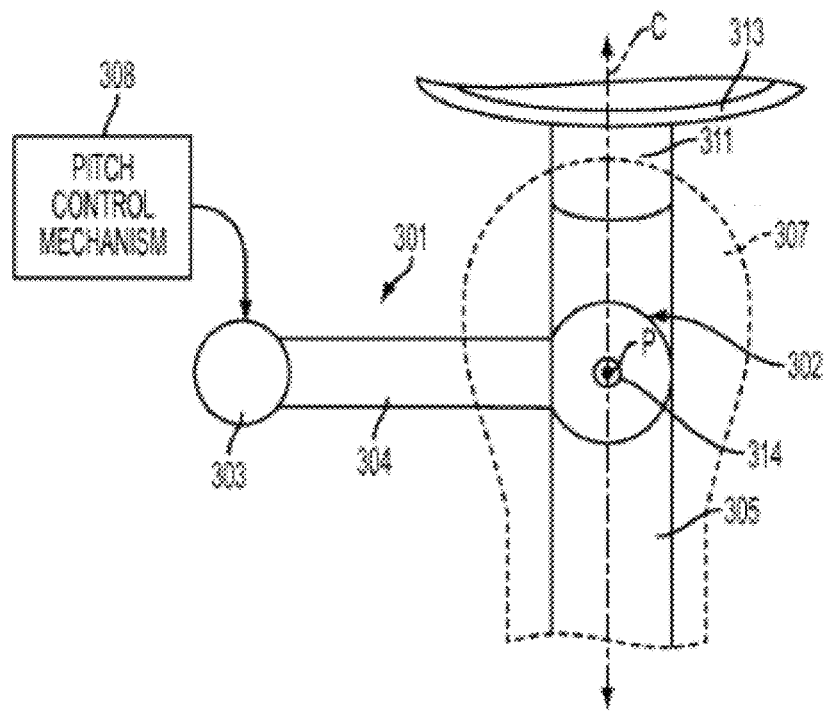
FIG. 3B is a top view of a portion of the rotor assembly according to an embodiment of the invention.

FIGS. 3A and 3B illustrate side/cross-section and top views, respectively, of a portion of a rotor assembly according to another embodiment of the invention. As illustrated in FIGS. 3A and 3B, a pitch horn 301 includes a first end 302, a second end 303, and a beam 304 connecting the first end 302 to the second end 303. The blade core includes a first portion 305 and a second portion 311 connected to a hub 313. The first portion 305 is configured to rotate with respect to the second portion 311, such as by bearing mechanisms or any other rotation mechanism. The first end 302 of the pitch horn 301 includes prongs 302a and 302b on opposite sides of the blade core portion 305.

The blade core made up of portions 305, 311 is covered along at least a portion of its length by a blade shell 307. In operation, a pitch control mechanism 308, such as a control beam, applies a force to the second end 303 of the pitch horn 301, causing the blade core 305 to rotate around the blade core pivot axis C. As a result, the pitch of the blade core 305 and the shell 307 are changed. In other words, the pitch horn 301 rotates together with the blade core portion 305 and the shell 307. In addition, the rotatable connection of the first end 302 of the pitch horn 301 with the blade core portion 305 allows the pitch horn 301 to rotate around the pivot axis P relative to the blade core portion 305.

As illustrated in FIG. 3B, in one embodiment a junction of the pitch horn 301 and the blade core portion 305 includes a hinge element extending through the blade core 305 and the end 302 of the pitch horn 301, such that the pitch horn 301 is configured to rotate around a center axis P of the hinge element. In one embodiment, the hinge element is a cylindrical cavity including a pin 314 located in the cavity to rotatably fix the pitch horn 301 to the blade core portion 305. However, embodiments are not limited to a cylinder and pin, and the hinge element may be any interface that rotatably connects the pitch horn 301 to the blade core portion 305.

While FIGS. 3A and 3B are provided to illustrate one structure of the pitch horn 301, and the rotation of the pitch horn 301 relative to the blade core 305 and the hub 313, these embodiments are provided by way of illustration and do not limit the present invention to the described or illustrated embodiments. It is understood that embodiments of the invention encompass rotor assemblies having additional structures, such as structures and mechanisms to permit the blade shell 307 to adjust a lead or lag position of the rotor blades or to adjust any other positional characteristics of the rotor blades.

In one embodiment, the pitch horn pivot axis P is substantially perpendicular or orthogonal to the blade core rotation axis C. In such an embodiment, "substantially" orthogonal means within around fifteen degrees of orthogonal. However, embodiments encompass any angular relationship between the pitch horn pivot axis P and the blade core rotation axis C. In particular, the pitch horn pivot axis P may have any non-parallel angular relationship with the blade core rotation axis C, including an acute angle, an obtuse angle, and a perpendicular or orthogonal angle. In addition, while FIGS. 2A, 2B, 3A, and 3B illustrate the pitch horn pivot axis P passing through the blade core rotation axis C, in one embodiment, the pitch horn pivot axis P does not pass through the blade core rotation axis C.

Figure 4A:
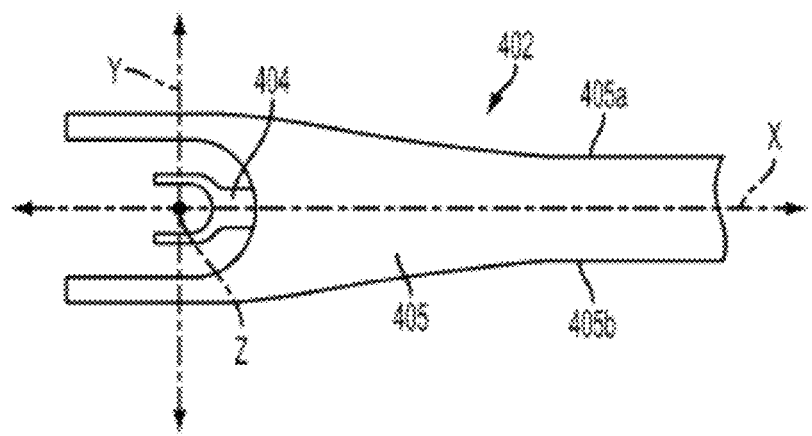
FIG. 4A illustrates a side view of a portion of a rotor blade according to an embodiment of the invention.
Figure 4B:
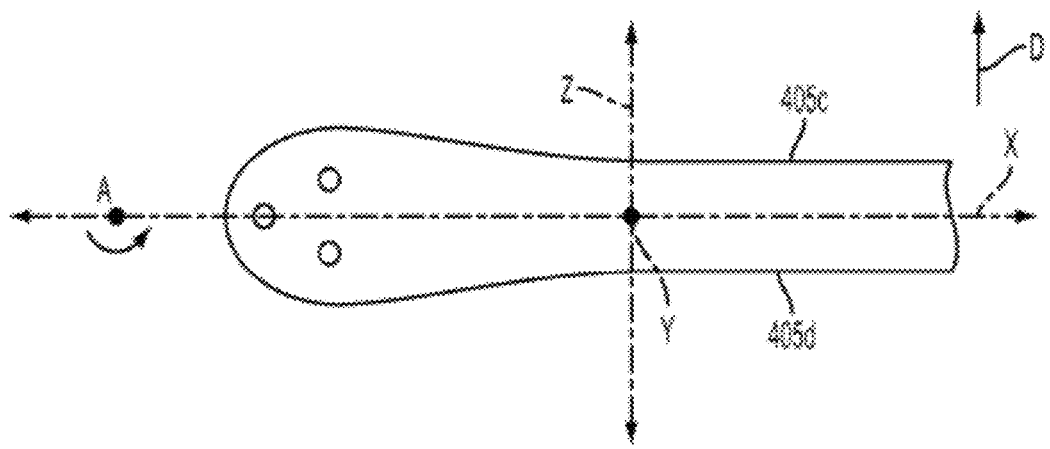
FIG. 4B illustrates a top view of the rotor blade according to one embodiment.

FIGS. 4A and 4B illustrate a side view of a rotor blade 402 and a top view of the blade 402, respectively. As illustrated in FIG. 4A, the blade has a blade core 404 and a shell 405, and the shell 405 has a first surface 405a and a second surface 405b. In an embodiment in which the blade 402 is part of a main rotor, the first surface 405a is an upper surface and the second surface 405b is a lower surface. However, embodiments of the invention encompass rotor blades having any orientation. The blade pitch rotation axis X of the blade 402 may extend from a hub-facing end of the blade 402 towards a tip of the blade 402. A height axis Y of the blade 402 is perpendicular to the pitch rotation axis X and extends through the first and second surfaces 405a and 405b of the shell 405. As illustrated in FIG. 4B, the width axis Z of the blade 402 is perpendicular to the pitch rotation axis X and the height axis Y, and extends in a direction from a leading edge 405c of the shell 405 to the trailing edge 405d of the shell 405, where the blade rotates in the direction D. In one embodiment, the pitch horn, such as the pitch horns 103, 201, and 301 of FIGS. 1, 2A, 2B, 3A, and 3B rotate around a pitch horn pivot axis that is substantially parallel to the height axis Y of the blade 402.

The pitch rotation axis X and the width axis Z define a first plane, and in one embodiment of the invention, the pitch horn rotates relative to the blade 402 along the first plane, or substantially along the first plane. For example, the pitch horn may rotate within five degrees of the first plane. In an embodiment in which the blade 402 is level, the first plane (defined by the pitch rotation axis X and the width axis Z) corresponds to a rotation plane of the blade 402 as the blade 402 rotates around a hub rotation axis of a rotating hub attached to an end of the blade 402.

Figure 5A:
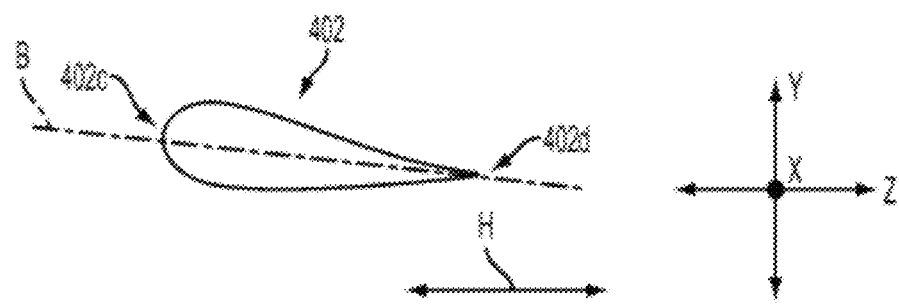
FIG. 5A illustrates a rotor blade having a first pitch according to one embodiment.
Figure 5B:
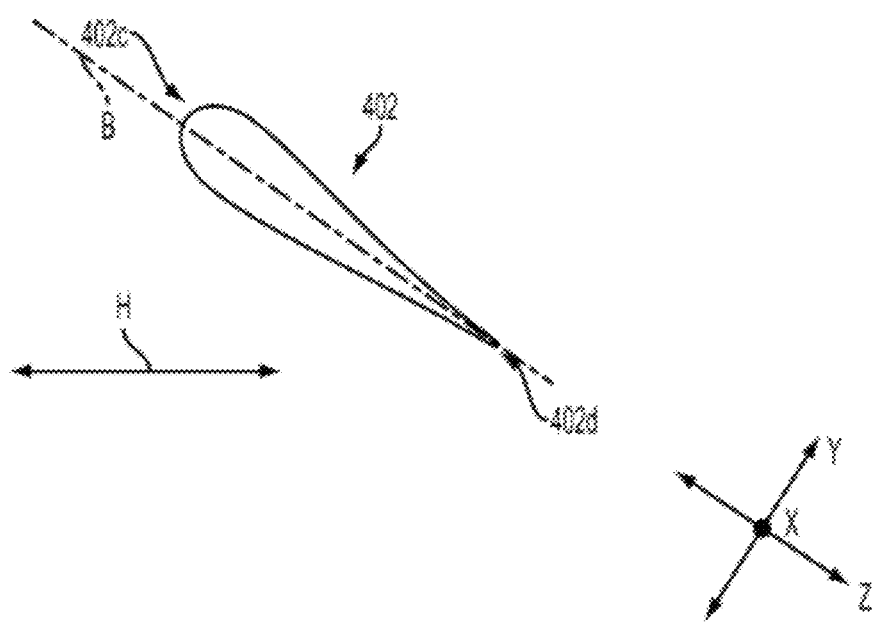
FIG. 5B illustrates a rotor blade having another pitch according to one embodiment.

FIGS. 5A and 5B illustrate side views of the blade 402 having different pitch inclinations. In FIGS. 5A and 5B, the axis H represents a horizontal axis, reference numeral 402c represents a leading edge of a rotor blade 402 and reference numeral 402d represents a trailing edge. However, it is understood that embodiments encompass any constant reference axis, and the axis H need not necessarily be a horizontal axis in each embodiment. In FIG. 5A, the leading edge 402c and trailing edge 402d of the blade 402 are aligned approximately along the horizontal axis H, such that the width axis Z of the blade 402 is arranged along the horizontal axis H. In FIG. 5B, the leading edge 402c and trailing edge 402d are arranged at an angle relative to horizontal axis H, such that the width axis Z of the blade 402 is elevated relative to the horizontal axis H. In other words, in the present specification and claims, the term "leading edge" and the term "trailing edge" refer to specific locations or regions on a blade 402, and do not change when the blade 402 is arranged at any pitch other than horizontal.

In embodiments of the invention, a plane B passing through the leading edge 402c and the trailing edge 402d of the blade along a predetermined length of the blade 402 is referred to as a blade plane B for purposes of description. A pitch horn (not shown in FIG. 5B) according to embodiments of the invention may rotate along the blade plane B while also rotating around a pitch rotation axis of the blade 402 to change a pitch of the blade 402. It is understood that the blade plane B need not pass through an extreme-most point at the front of the blade and the extreme-most point at the tail of the blade, but may pass through any point on the leading edge of the blade and any point on or near the trailing edge of the blade 402. In other words, the pitch horn may be configured to rotate along a plane passing through any point on the leading edge of the blade and any point on the trailing edge of the blade. In addition, the pitch horn may be configured to rotate along a plane that is substantially parallel to the blade plane B, where "substantially parallel" includes angles of thirty degrees or less with respect to the blade plane. In addition, the pitch horn may be configured to rotate around a pitch horn pivot axis that is substantially orthogonal to the blade plane B, where "substantially orthogonal to the blade plane" includes angles of thirty degrees or less relative to orthogonal. In addition, embodiments encompass other configurations of the pitch horn relative to the blade plane, including configurations in which the pitch horn pivot axis is substantially parallel to the blade plane or arranged at any other angle relative to the blade plane.

Figure 6:
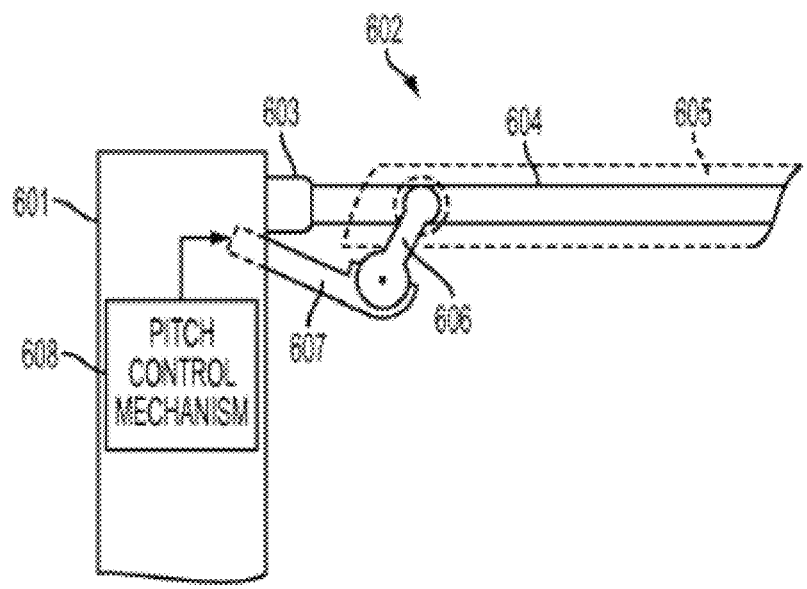
FIG. 6 illustrates a rotor assembly according to an embodiment of the invention.

Embodiments of the invention encompass a pitch horn and assembly including the pitch horn that are connected to a blade core and configured to generate a low drag as a rotor blade rotates around a hub. FIG. 6 illustrates an embodiment in which a control beam 607 has one end connected to the pitch horn 606 and an opposite end located inside a rotor hub 601. In particular, the rotor assembly of FIG. 6 includes a rotor hub 601, a fixed blade mount portion 603, a rotating blade core 604 which is rotated to vary the pitch of the blade 602, and a blade shell 605 which is illustrated with dashed lines. A pitch horn 606 is connected to the blade core 604 and is operated by the control beam 607 to adjust the pitch of the blade core 604. A pitch control mechanism 608, such as a rod, a plate, or any other mechanism connectable to the control beam 607 is located inside the hub 601 and applies a force to the end of the control beam 607, which in turn applies force to the pitch horn 606 to adjust the pitch of the blade 602.

In FIG. 6, portions of the control beam 607 and pitch horn 606 are illustrated below the blade core 604 and blade shell 605. Embodiments of the invention encompass any configuration of the pitch horn 606 relative to the blade core 604 and blade shell 605, including extending below the blade core 604 and blade shell 605, extending above blade core 604 and blade shell 605, or located between an upper blade plane defined by a rotation of the upper surface of the blade shell 605 around the hub 601 and a lower blade plane defined by the rotation of the lower surface of the blade shell 605 around the hub 601.

In one embodiment, one or both of the pitch horn 606 and the control beam 607 are located substantially along a rotation plane of the blade core 604 or the blade shell 605, defined as a center plane along which the blade core 604 and blade shell 605 rotate around the hub 601. In such an embodiment, the pitch horn 606 being "substantially" along the rotation plane of the blade includes having its first end located along the rotation plane and having the rest of the pitch horn 606 either located along the rotation plane or arranged at an acute angle relative to the rotation plane. Similarly, in one embodiment, the pitch horn 606 is located substantially above a lower plane defined by a lower outer surface of the blade shell 605 or substantially below an upper plane defined by an upper outer surface of the blade shell 605. In such an embodiment, being "substantially" above the lower plane and below the upper plane means that a majority of the pitch horn 606 is above the lower plane, and a majority of the pitch horn is below the upper plane.

Figure 7:
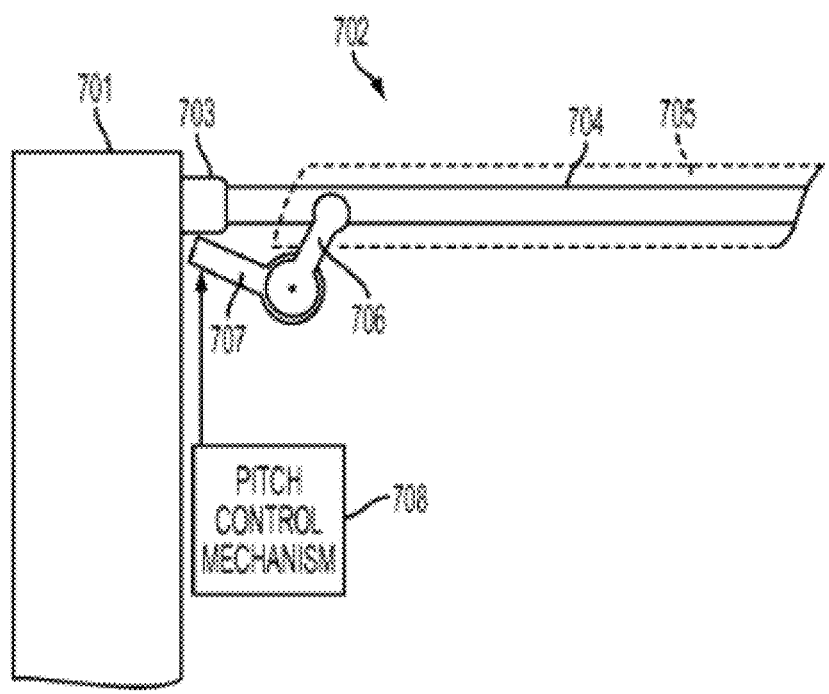
FIG. 7 illustrates a rotor assembly according to another embodiment of the invention.

In an alternative embodiment illustrated in FIG. 7, the pitch control mechanism 708 may be located outside the hub 701. In particular, the rotor assembly of FIG. 7 includes a rotor hub 701, a fixed blade mount portion 703, a rotating blade core 704 which is rotated to vary the pitch of the blade 702, and a blade shell 705 which is illustrated with dashed lines. A pitch horn 706 is connected to the blade core 704 and is operated by the control beam 707 to adjust the pitch of the blade core 704. A pitch control mechanism 708, such as a rod, a plate, or any other mechanism connectable to the control beam 707 is located outside the hub 701 and applies a force to the end of the control beam 707, which in turn applies force to the pitch horn 706 to adjust the pitch of the blade 702.

While the control beam 707 and pitch horn 706 are illustrated below the blade core 704 for purposes of description, it is understood that the pitch horn 706 and control beam may instead be within the rotation plane of the blade 702, or at another location in the vicinity of the blade 702.

Figure 8:
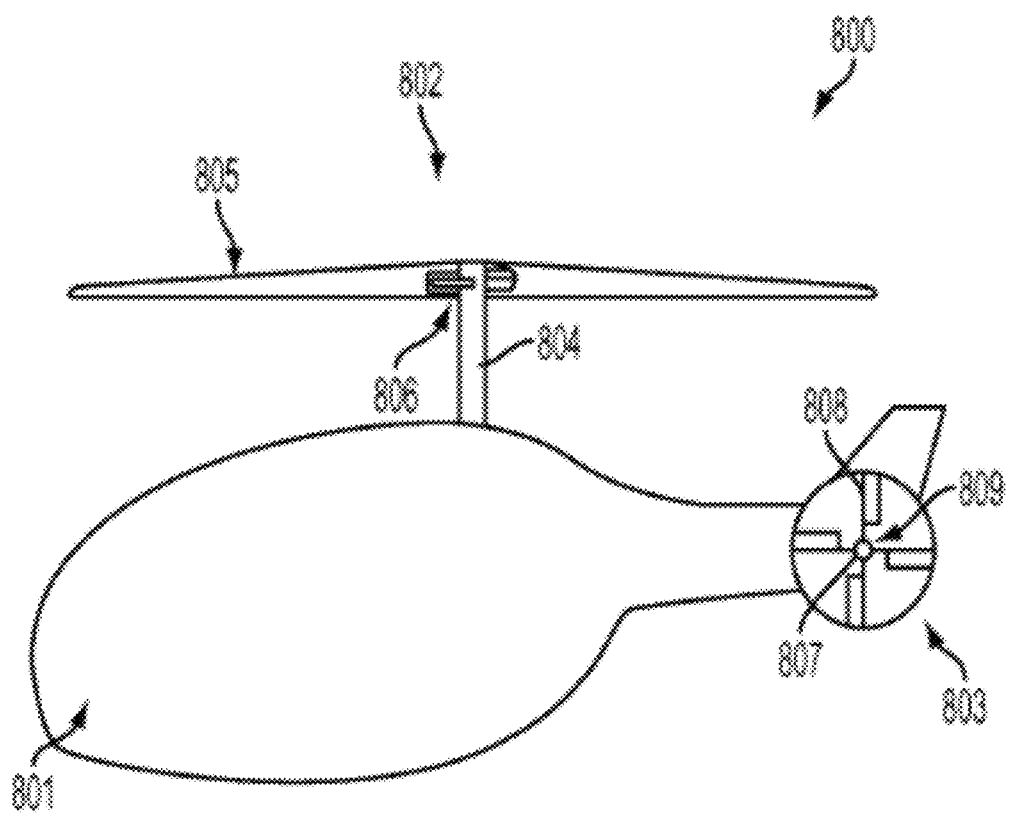
FIG. 8 illustrates a rotorcraft according to an embodiment of the invention.

Embodiments of the invention encompass any vehicle or structure including a rotor or similar device that rotates about a hub having blades with an adjustable blade pitch. FIG. 8 illustrates a rotorcraft 800 according to an embodiment of the invention. The rotorcraft 800 includes a rotorcraft body 801 and a rotor assembly 802. The rotor assembly 802 includes blades 805 which rotate about a hub 804, and a pitch control mechanism 806 that controls a pitch of the blades 805. The rotor assembly 802 may correspond to the rotor assembly 100 of FIG. 1, and the pitch control mechanism 806 may include the pitch horn 103, 201, or 301 of FIGS. 1, 2A, and 3A, respectively. In the embodiment illustrated in FIG. 8, the rotorcraft 800 includes a second rotor assembly 803. The second rotor assembly 803 includes blades 808 which rotate about a hub 807, and a pitch control mechanism 809 that controls a pitch of the blades 808. The second rotor assembly 803 may correspond to the rotor assembly 100 of FIG. 1, and the pitch control mechanism 809 may include the pitch horn 103, 201, or 301 of FIGS. 1, 2A, and 3A, respectively. While one configuration of the first and second rotor assemblies 802 and 803 with respect to the rotorcraft body 801 is illustrated in FIG. 8, embodiments of the invention encompass any configuration of the first and second rotor assemblies 802 and 803 with respect to the rotorcraft body 801 and each other.

According to embodiments of the invention, a rotor assembly is provided having a pitch horn to adjust a pitch of rotor blades. The pitch horn is configured to rotate together with the rotor blade to change a pitch of the rotor blade, and also to rotate relative to the rotor blade. In some embodiments, the pitch horn rotates relative to the rotor blade substantially along a plane defined by a width of the rotor blade and a pitch rotation axis of the rotor blade. Embodiments also encompass a control beam connected to the pitch horn having one end located inside a rotor hub. Alternative embodiments also encompass a control beam connected to the pitch horn having one end located outside a rotor hub.

Technical effects of embodiments of the invention include a reduction in drag on the rotor due to the configuration of one or both of the pitch horn and the control beam relative to the rotor blades, although other effects (such as reduced size) may be exhibited in other contexts in addition to or instead of drag technical effects depending on the implementation. Additional technical effects include the ability to eliminate a conventional outboard control rod which is located outside a rotor hub to control the pitch of one or more blades of the rotor hub.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. By way of example, aspects can be used in rotor blade assemblies used in conventional or coaxial helicopters, tilt wing aircraft, fixed wing aircraft, wind turbines, and maritime propellers. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A rotor assembly, comprising:
a rotor hub which rotates about a hub rotation axis;
a blade connected to the rotor hub and configured to rotate with the rotor hub around the hub rotation axis, the blade including a blade core having a first portion connected to the rotor hub and a second portion configured to rotate around a pitch rotation axis of the blade relative to the first portion to adjust a pitch of the blade;
a pitch horn having a first end rotatably connected to the second portion of the blade core, an interface between the pitch horn and the second portion of the blade core including at least two prongs, the pitch horn configured to rotate with the blade around the pitch rotation axis of the blade to adjust the pitch of the blade, and the pitch horn being configured to rotate relative to the blade around a pitch horn pivot axis arranged at a non-parallel angle relative to the pitch rotation axis of the blade, wherein the pitch horn pivot axis is oriented parallel to the hub rotation axis;
a control beam includes a first end and a second end, the first end of the control beam being connected to a second end of the pitch horn opposite the first end such that actuation of the control beam moves the second end of the pitch horn, causing the first end of the pitch horn to rotate around the pitch rotation axis of the blade and around the pitch horn pivot axis, wherein actuation of the control beam includes rotation of the control beam around a control beam rotation axis located at a position between the first end of the control beam and the second end of the control beam.

2. The rotor assembly of claim 1, wherein a blade plane is defined as a plane substantially passing through a leading edge and a trailing edge of the blade, and
the pitch horn pivot axis is substantially orthogonal to the blade plane.

3. The rotor assembly of claim 1, wherein the pitch horn pivot axis is substantially orthogonal to the pitch rotation axis of the blade.

4. The rotor assembly of claim 1, wherein the blade includes a blade shell that covers the blade core.

5. The rotor assembly of claim 1, wherein a junction of the pitch horn and the blade includes a hinge element extending through the blade and the first end of the pitch horn, such that the pitch horn is configured to rotate around a center axis of the hinge element.

6. The rotor assembly of claim 5, wherein the hinge element includes one or more fixing pins extending through the hinge element to connect the blade to the pitch horn.

7. The rotor assembly of claim 1, wherein the pitch horn is located substantially above a lower plane defined by a lower outer surface of the blade and substantially below an upper plane defined by an upper outer surface of the blade.

8. The rotor assembly of claim 1, wherein the second end of the pitch horn includes a spherical joint connected to the control beam.

9. The rotor assembly of claim 8, wherein the control beam includes a first end connected to the pitch horn and a second end opposite the first end, and the second end of the control beam is located inside the rotor hub.

10. The rotor assembly of claim 1, wherein the control beam includes a first end connected to the pitch horn and a second end opposite the first end, and actuation of the control beam includes rotation of the control beam around a control beam rotation axis at the second end of the control beam.

11. A pitch horn, comprising:
a first end having a first joint element defining a pitch horn pivot axis, such that the first end pivots relative to a blade connected to the first end;
a second end including a spherical joint for connecting to a pivot control element that applies a force to the spherical joint to cause the pitch horn to pivot around the pitch horn pivot axis and around a pitch rotation axis of the blade connected to the joint element to change a pitch of the blade; and
a beam connecting the first end to the second end;
wherein the first end of the pitch horn includes a single prong for fitting between two prongs of a blade core, the single prong including a joint element for rotatably connecting to the two prongs of the blade core to define the pitch horn pivot axis.

12. A rotorcraft, comprising:
a rotorcraft body; and
a rotor assembly to control movement of the rotorcraft body, the rotor assembly comprising:
a rotor hub which rotates about a hub rotation axis;
a blade connected to the rotor hub and configured to rotate with the rotor hub around the hub rotation axis, the blade including a blade core having a first portion connected to the rotor hub and a second portion configured to rotate around a pitch rotation axis of the blade to adjust a pitch of the blade; and
a pitch horn having a first end rotatably connected to the second portion of the blade core, an interface between the pitch horn and the second portion of the blade core including at least two prongs, the pitch horn configured to rotate with the blade around the pitch rotation axis of the blade to adjust the pitch of the blade, and the pitch horn configured to rotate relative to the blade around a pitch horn pivot axis arranged at a non-parallel angle relative to the pitch rotation axis of the blade, wherein the pitch horn pivot axis is oriented parallel to the hub rotation axis;

a control beam includes a first end and a second end, the first end of the control beam being connected to a second end of the pitch horn opposite the first end such that actuation of the control beam moves the second end of the pitch horn, causing the first end of the pitch horn to rotate around the pitch rotation axis of the blade and around the pitch horn pivot axis, wherein actuation of the control beam includes rotation of the control beam around a control beam rotation axis located at a position between the first end of the control beam and the second end of the control beam.

13. The rotorcraft of claim 12, wherein a blade plane is defined as a plane substantially passing through a leading edge and a trailing edge of the blade, and the pitch horn pivot axis is substantially orthogonal to the blade plane.

14. The rotorcraft of claim 12, wherein the blade includes a blade shell that covers the blade core.

15. The rotorcraft of claim 12, wherein a junction of the pitch horn and the blade includes a hinge element extending through the blade and the first end of the pitch horn, such that the pitch horn is configured to rotate around a center axis of the hinge element.

16. The rotorcraft of claim 12, wherein the rotor assembly includes a first rotor assembly for controlling an altitude of the rotorcraft and a second rotor assembly substantially orthogonal to the first rotor assembly for controlling one or both of a directional facing and a speed of the rotorcraft, and the pitch horn includes a first pitch horn of the first rotor assembly and a second pitch horn of the second rotor assembly.

* * * * *